US008756407B2

(12) United States Patent
Lim (10) Patent No.: US 8,756,407 B2
(45) Date of Patent: Jun. 17, 2014

(54) CONFIGURATION RULE PROTOTYPING TOOL

(75) Inventor: Kai Peng Lim, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 1497 days.

(21) Appl. No.: 12/241,241

(22) Filed: Sep. 30, 2008

(65) Prior Publication Data
US 2010/0082954 A1 Apr. 1, 2010

(51) Int. Cl.
*G06F 15/177* (2006.01)
(52) U.S. Cl.
USPC .............................................. 713/1
(58) Field of Classification Search
USPC .............................................. 713/1
See application file for complete search history.

(56) References Cited

U.S. PATENT DOCUMENTS

| | | | |
|---|---|---|---|
| 5,247,683 A * | 9/1993 | Holmes et al. ............... 709/221 |
| 5,386,564 A * | 1/1995 | Shearer et al. ............... 1/1 |
| 5,537,592 A | 7/1996 | King et al. |
| 5,555,346 A | 9/1996 | Gross et al. |
| 5,950,011 A * | 9/1999 | Albrecht et al. ............. 717/167 |
| 6,243,835 B1 * | 6/2001 | Enokido et al. ............. 714/38.1 |
| 6,253,205 B1 | 6/2001 | Quarato et al. |
| 6,473,765 B1 | 10/2002 | Fink |
| 6,523,205 B1 | 2/2003 | Broker et al. |
| 6,587,124 B1 * | 7/2003 | Slaby ........................... 715/735 |
| 6,850,947 B1 | 2/2005 | Chung et al. |
| 6,931,575 B2 * | 8/2005 | Smith et al. .................. 714/44 |
| 7,228,497 B2 | 6/2007 | Lander |
| 7,725,702 B2 | 5/2010 | Arnfield et al. |
| 7,752,156 B2 * | 7/2010 | Stich et al. .................. 706/50 |
| 7,836,063 B2 | 11/2010 | Salazar et al. |
| 7,856,415 B2 | 12/2010 | Gatti |
| 7,926,012 B1 * | 4/2011 | Parimi et al. ................. 716/106 |
| 7,970,779 B2 | 6/2011 | Smirnov et al. |
| 8,032,828 B2 | 10/2011 | Su et al. |
| 8,086,618 B2 | 12/2011 | Lim |
| 8,332,193 B2 * | 12/2012 | McKim et al. ................ 703/6 |

(Continued)

FOREIGN PATENT DOCUMENTS

EP 0463251 A1 2/1992

OTHER PUBLICATIONS

U.S. Appl. No. 12/241,226, filed Sep. 30, 2008, Lim.
U.S. Appl. No. 12/241,217, filed Sep. 30, 2008, Lim.
Koehn et al., "Statistical Phrase-Based Translation", Proceedings of HLT-NAACL 2003, Main Papers, Edmonton Canada, May-Jun. 2003, pp. 48-54.
Sheard et al., "Template Meta-programming for Haskell", ACM SIGPLAn Notices, vol. 37, No. 12, Dec. 2002, pp. 60-75.

(Continued)

*Primary Examiner* — Kim Huynh
*Assistant Examiner* — Eric Chang
(74) *Attorney, Agent, or Firm* — Yee & Associates, P.C.; Steven L. Bennett (57) ABSTRACT

A system for automatically creating configuration rule build files. One or more feature inputs are received according to requirements for a specific product by a configuration rule prototyping tool. The one or more feature inputs are source data. A selection of a function from a list of functions defined for the configuration rule prototyping tool and a selection of one or more build types is received by the configuration rule prototyping tool. A configuration rule build process is performed by the configuration rule prototyping tool based on the function and the one or more build types selected to format the source data into a desired format. The formatted source data is transferred to a configurable transformation macro. Configuration rule build files are automatically created by the configurable transformation macro for the specific product. Then, the configuration rule build files are outputted for use by a test client.

9 Claims, 7 Drawing Sheets

(56) References Cited

U.S. PATENT DOCUMENTS

| | | |
|---|---|---|
| 2001/0056460 A1 | 12/2001 | Sahota et al. |
| 2002/0143823 A1 | 10/2002 | Stevens |
| 2004/0083465 A1 | 4/2004 | Zhang et al. |
| 2005/0095008 A1* | 5/2005 | DeCusatis et al. ............ 398/164 |
| 2005/0097454 A1 | 5/2005 | Kinno et al. |
| 2005/0154983 A1 | 7/2005 | Hailey et al. |
| 2005/0198631 A1* | 9/2005 | Bisher et al. .................. 717/178 |
| 2005/0240483 A1* | 10/2005 | Ito et al. .......................... 705/24 |
| 2005/0251501 A1 | 11/2005 | Phillips et al. |
| 2006/0106856 A1 | 5/2006 | Bermender et al. |
| 2006/0259470 A1 | 11/2006 | Chandrasekharan et al. |
| 2007/0016764 A1 | 1/2007 | Arnfield et al. |
| 2007/0073736 A1 | 3/2007 | Goetz |
| 2007/0186150 A1 | 8/2007 | Rao et al. |
| 2007/0198564 A1 | 8/2007 | Blackstone et al. |
| 2007/0261025 A1 | 11/2007 | Seto et al. |
| 2007/0299854 A1 | 12/2007 | Bohlmann et al. |
| 2008/0022263 A1 | 1/2008 | Bak et al. |
| 2010/0082523 A1 | 4/2010 | Lim |
| 2010/0082706 A1 | 4/2010 | Lim |
| 2011/0040824 A1 | 2/2011 | Harm |

OTHER PUBLICATIONS

Mariatos et al., "A Mapping Algorithm for Computer Assisted Exploration in the Design of Embedded Systems", ACM Transactions on Design Automation of Electronic Systems, vol. 6, No. 1, Jan. 2001, pp. 122-147.

Roll, "Towards Model-Based and CCM-Based Applications for Real-Time Systems", Proceedings of the Sixth IEEE International Symposium on Object Oriented Real Time Distributed Computing, 2003, pp. 1-8.

USPTO Non-final office action dated Mar. 16, 2011 regarding U.S. Appl. No. 12/241,217.

USPTO Notice of allowance dated Aug. 26, 2011 regarding U.S. Appl. No. 12/241,217.

USPTO Non-final office action dated Jun. 24, 2011 regarding U.S. Appl. No. 12/241,226.

USPTO Notice of Allowance regarding U.S. Appl. No. 12/241,226, dated Dec. 12, 2011, 14 pages.

Notice of Allowance regarding U.S. Appl. No. 12/241,226, dated Jan. 24, 2012, 12 pages.

Notice of Allowance regarding U.S. Appl. No. 12/241,226, dated Feb. 17, 2011, 12 pages.

* cited by examiner

FROM FIG. 5A

| Compatibility Filtering | Dynamic Min Max | | | |
|---|---|---|---|---|
| Compatible | Required Parts | LHSProperty/Component | RHSProperty/Component | OCScope | Comment |
| No | | 1671 | 9070 | 9071 | 9072 | 9195 | Listed | lmk A@20080401 |
| No | 4209$=0~4363421​0$=0 | 1771 | 9070 | 9071 | 9072 | 9195 | Listed | lmk A@20080401 |
| No | | OS_DUMMY_OC#PM_P_ARB_OSType@C | 9200 | Listed | lmk A@20080401 |

[Search] [Add] [Copy] [Update] [Delete] ☑ MT Compatible [List] [Remove]

Required Parts: _______________

LHSProperty/Component: _______________

RHSProperty/Component: _______________ [Update]

Compatible: [No ▼]  Option Class Scope: [Listed]  Comment: _______________ [Update]

_______________ [Update]

FIG. 5B

500
GUI

FIG. 7

CONFIGURATION RULE PROTOTYPING TOOL

BACKGROUND OF THE INVENTION

1. Field of the Invention

The present invention relates generally to an improved data processing system and more specifically to a computer implemented method, system, and computer usable program code for automatically creating configuration rule build files.

2. Description of the Related Art

Historically, product design developers or modelers had to wait for the configuration rule build process to be completed and validated prior to any configuration rule testing being possible. Also, prior to starting the configuration rule build process, several key product design developers were required to perform code review on the type of configuration rules that were to be used on a particular product design and the format or syntax of those configuration rules. These product design developers create these configuration rules regarding every aspect of a product design, such as, for example, an xSeries server is limited to including only two peripheral component interconnect extended (PCI-X) adapters.

In the current configuration rule development context, product design developers are required to manually model these configuration rules into a comma-separated values (CSV) file format before these modelers can check-in to a configuration rule build process and create configuration rule build files. The product design developers use these created configuration rule build files to test configuration rules for specific product designs in a local test client. A local test client is a web-based configuration application, which interacts with a rule engine and a runtime database for product configuration purposes.

The rule engine needs the configuration rule build files to execute the configuration rules that had already been defined by the product design developers based on requirements templates for the different product designs. These requirements templates are Microsoft® Excel® (.xls) document files, which contain part numbers or feature codes, descriptions, and rules specific to the configurations of the particular products being prototyped or modeled. A feature code is a reusable number used by the configuration system that represents a particular part number.

BRIEF SUMMARY OF THE INVENTION

According to one embodiment of the present invention, configuration rule build files are automatically created. One or more feature inputs are received according to requirements for a specific product by a configuration rule prototyping tool. The one or more feature inputs are source data. A selection of a function is received by the configuration rule prototyping tool from a list of functions defined for the configuration rule prototyping tool. A selection of one or more build types is received by the configuration rule prototyping tool. A configuration rule build process is performed by the configuration rule prototyping tool based on the function and the one or more build types selected to format the source data into a desired format to form formatted source data. The formatted source data is transferred to a configurable transformation macro. Configuration rule build files are automatically created by the configurable transformation macro for the specific product. Then, the configuration rule build files are outputted for use by a test client.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
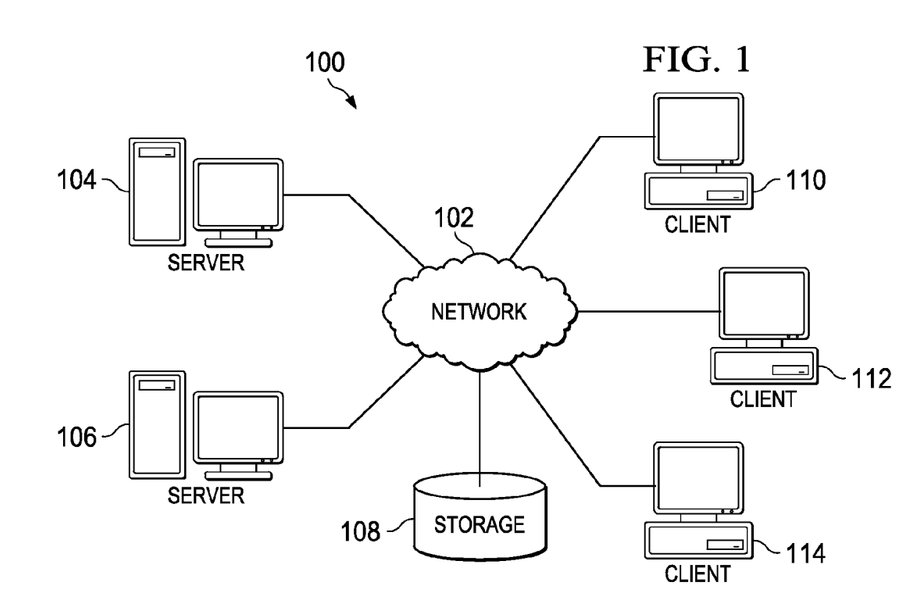
FIG. 1 is a pictorial representation of a network of data processing systems in which illustrative embodiments may be implemented.
Figure 2:
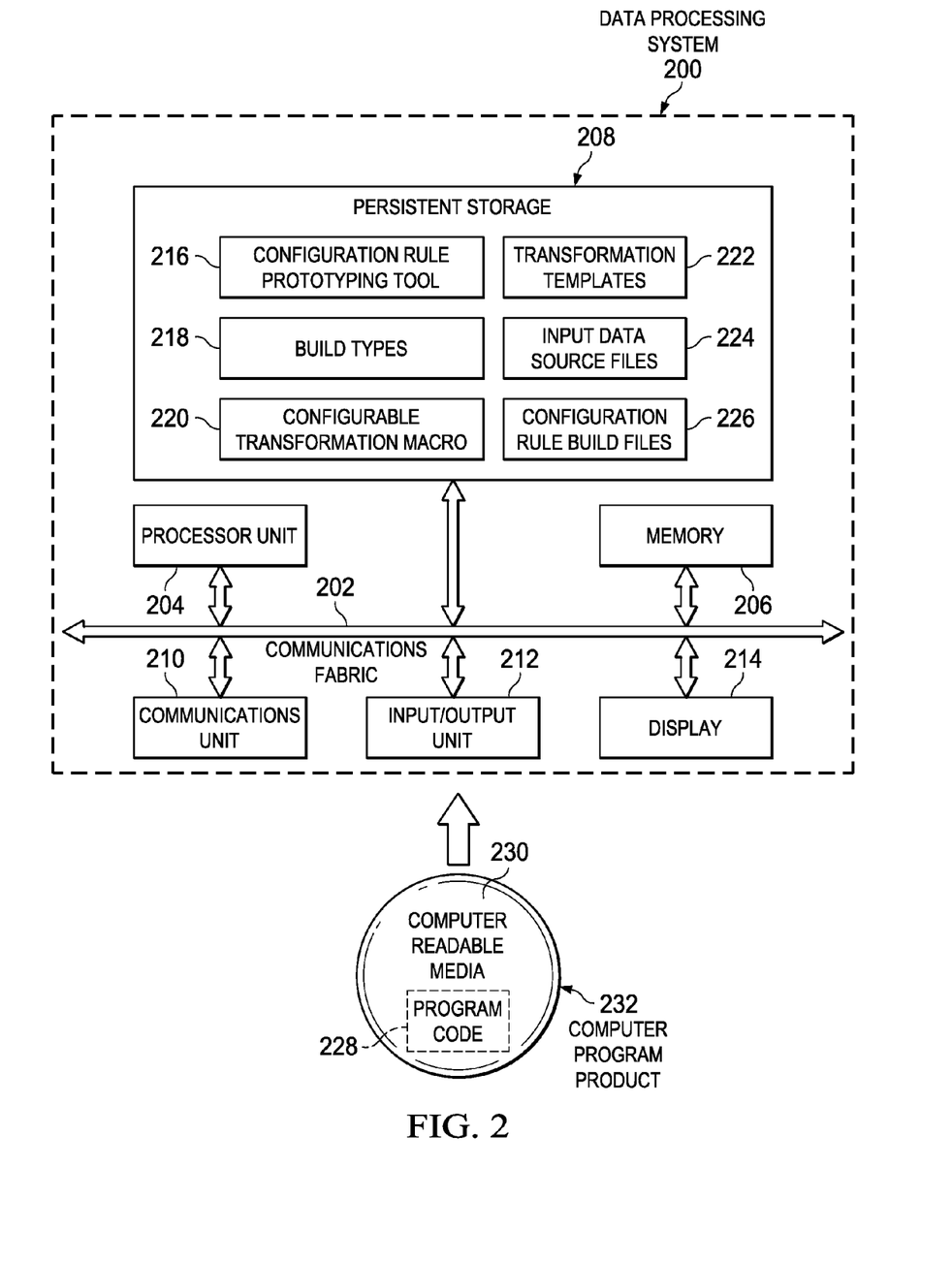
FIG. 2 is a diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to data processing environments in which different illustrative embodiments may be implemented. Many modifications to the depicted environments may be made.

FIG. 1 depicts a pictorial representation of a network of data processing systems in which illustrative embodiments may be implemented. Network data processing system 100 is a network of data processing systems, such as, for example, computers and other devices, in which the illustrative embodiments may be implemented. Network data processing system 100 contains network 102. Network 102 is the medium used to provide communications links between the various computers and other devices connected together within network data processing system 100. Network 102 may include connections, such as wire, wireless communication links, or fiber optic cables.

In the depicted example, server 104 and server 106 connect to network 102, along with storage unit 108. Storage 108 represents any type of storage device that is capable of storing data in a structured or unstructured format. Also, storage 108 may represent a plurality of storage units coupled to network 102. Storage 108 may, for example, be a database that stores runtime environment data for configuration rule build processes, configuration rules for a plurality of configurable products, feature codes for the plurality of configurable products, and configuration rule build files. A configuration rule is a rule that defines a specific constraint on the configuration of a particular product. For example, a particular version of a data processing system may be restricted to only include four or fewer dual inline memory modules (DIMMs) or be limited to only a specific operating system (OS), such as an Advanced Interactive eXecutive (AIX®) OS. A configuration rule build file is a file that contains a set of specific configuration rules for a particular configuration of a product, such as a particular machine type or model (MTM).

Client devices 110, 112, and 114 also connect to network 102. Client devices 110, 112, and 114 may, for example, be personal computers, network computers, personal digital assistants (PDAs), or smart cellular telephones. Client devices 110, 112, and 114 are clients to server 104 and/or server 106 in this example. In addition, client devices 110, 112, and 114 may each include a local test client application. A local test client is a web-based configuration application, which interacts with a rule engine and a runtime database for product configuration testing purposes.

Server 104 and/or server 106 may, for example, provide web-based product configuration services to client devices 110, 112, and 114. Furthermore, server 104 and server 106 may also provide data, such as boot files, operating system images, and applications to client devices 110, 112, and 114. Moreover, network data processing system 100 may include additional servers, clients, and other devices not shown to implement processes of illustrative embodiments.

Of course, network data processing system 100 may be implemented as a number of different types of networks, such as, for example, an intranet, a local area network (LAN), a wide area network (WAN), or the Internet. Also, is should be noted that FIG. 1 is only intended as an example and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display unit 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip.

As another illustrative example, processor unit 204 may be a symmetric multi-processor system containing multiple processors of the same type.

Memory 206, in these examples, may be, for example, a random access memory (RAM) or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208. In addition, persistent storage 208 may represent a plurality of persistent storage units.

Configuration rule prototyping tool 216, build types 218, configurable transformation macro 220, transformation templates 222, input data source files 224, and transformed configuration rule build files 226 reside on persistent storage 208. Configuration rule prototyping tool 216 is a software application that automatically creates and validates configuration rule build files for configurable products. Build types 218 represent one or more types of configuration rule build file processes that are used by configuration rule prototyping tool 216 to create the desired transformation output data or action. A build type is a key or pointer tied to one or more build processes, which are triggered prior to the creation of configuration rule build files 226.

Configurable transformation macro 220 is a macro for translating or transforming source input data that is stored in one particular file format into another file format. The word "configurable" means that configurable transformation macro 220 may be configured to be used in a plurality of different application types. A macro is a rule or pattern that specifies how a particular data input sequence should be mapped to an output sequence according to a defined process or procedure. A file format is a specific way to encode data for storage in a computer file, such as, for example, a CSV file format.

Configurable transformation macro 220 may use a transformation macro script, such as JavaScript®, to control the process of transforming the source input data from one file format to another. In addition, configurable transformation macro 220 utilizes transformation templates 222 in the source input data transformation process. Transformation templates 222 represent one or more transformation templates that contain, for example, source input data, default values, and logic used by configurable transformation macro 220 in the data transformation process.

Input data source files 224 represent one or more files that contain input source data, which configurable transformation macro 220 reads and translates into the desired transformation output. Even though this exemplary illustration shows input data source files 224 residing on persistent storage 208, input data source files 224 may alternatively reside on a remote database, such as storage 108 in FIG. 1. Configuration rule build files 226 represents the desired final output of the logical processing of input data source files 224 by configurable transformation macro 220 using transformation templates 222. Configuration rule build files 226 contain a set of configuration rules, feature codes, parameters, attributes, and expressions for one or more prototyped products. Configuration rule build files 226 are files that contain data and constraints, which feed into a rule engine. Configuration rule build files 226 are used as runtime instructions for data processing system 200.

Communications unit 210, in these examples, provides for communications with other data processing systems or devices, such as, for example, server 104 in FIG. 1. In these examples, communications unit 210 is a network interface card. Communications unit 210 may provide communications through the use of either, or both, physical and wireless communications links.

Input/output unit 212 allows for input and output of data with other devices that may be connected to data processing system 200. For example, input/output unit 212 may provide a connection for user input through a keyboard. Display unit 214 provides a mechanism to display information to a user of data processing system 200.

Instructions for the operating system and applications or programs are located on persistent storage 208. The instructions for the operating system and applications or programs may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different illustrative embodiments may be embodied on different physical or tangible computer-readable media, such as memory 206 or persistent storage 208.

Program code 228 is located in a functional form on computer-readable media 230 and may be loaded onto or transferred to data processing system 200 for execution by processor unit 204. Program code 228 and computer-readable media 230 form computer program product 232 in these examples. In one example, computer-readable media 230 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 230 also may take the form of a persistent storage, such as a hard drive or a flash memory that is connected to data processing system 200. The tangible form of computer-readable media 230 is also referred to as computer-recordable storage media.

Alternatively, program code 228 may be transferred to data processing system 200 from computer-readable media 230 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different illustrative embodiments may be implemented. The different illustrative embodiments may be implemented in a data processing system including components in addition to, or in place of, those illustrated for data processing system 200. Other components shown in FIG. 2 may be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub, which may be present in communications fabric 202.

Illustrative embodiments provide a computer implemented method, system, and computer usable program code for automatically building configuration rule build files. In addition, illustrative embodiments are able to generate new configuration rules for existing product models or create complete prototyped models for new products. Developers or modelers are only required to populate data into the configuration rule prototyping tool and execute the build process to create configuration rule build files. As a result, developers are able to almost instantly test these newly created configuration rule build files in a local test client. Testing these newly created configuration rule build files in a local test client will reflect exactly how these configuration rule build files will be used in a production environment. Thus, illustrative embodiments allow for a more efficient way to develop and model configuration rules for testing prototyped products.

Consequently, the configuration rule prototyping tool allows developers to create configuration rule build files to be used for testing of prototyped products in a local test client in a fast and easy way. The configuration rule prototyping tool is extensible to provide functionalities, such as, for example, creation of a new product type based on a predecessor. In addition, illustrative embodiments do not require code review by key developers because the configuration rule prototyping tool outputs the configuration rules in the proper format or syntax. Also, illustrative embodiments provide configuration rule recommendations or optimizations for a prototyped product. Further, the configuration rule prototyping tool provides the developer with a single user interface environment for configuration rule prototyping purposes.

Product prototyping is not a part of product modeling, but instead product modeling is a part of product prototyping. Prototyping includes the creation of runtime build files, such as, for example, .kml, .kbs, class, and .exe files, while modeling only provides the creation of data, rules, and constraints for the build files. In addition, prototyping provides illustrative embodiments with functionalities, such as, for example, recommending configuration rules for new product prototypes, searching previously prototyped product data, searching existing configuration rules or constraints, and searching existing prototyped products for reference or study by developers for current prototyping needs.

Furthermore, illustrative embodiments are independent of a particular configuration rule engine. Illustrative embodiments may use plug-in programs with properly created input/output (I/O) interfaces, which allow for interfacing with a plurality of different types of configuration rule engines. A plug-in is a computer program that interacts with a host application, such as the configuration rule prototyping tool, to provide a certain, usually very specific, function "on demand." However, plug-ins are not just for extending the behavior of the configuration rule prototyping tool. Illustrative embodiments do not require that the plug-ins tie in with interfaces of the configuration rule prototyping tool to provide extended prototyping or modeling features.

Moreover, illustrative embodiments allow importing and exporting of flat file of different formats, rules, and models with constraints to and from working environments using these plug-in programs. In addition, illustrative embodiments are independent of deployment environment. In other words, illustrative embodiments may be used whether the configuration rule prototyping tool is web-based or standalone.

Illustrative embodiments may reference an existing product to create a prototype of a new product. Consequently, illustrative embodiments may reduce development efforts for new products. Thus, illustrative embodiments may improve developer productivity by allowing developers to come up with more innovative ways to handle daily tasks.

Illustrative embodiments allow developers to create a plurality of different working environments for prototyping, but creation of different working environments is not required. The configuration rule prototyping tool may be used as a decentralized tool for product prototyping. In addition, the configuration rule prototyping tool does not require a database connection, but may utilize a database connection if necessary. Illustrative embodiments may demonstrate existing products or prototype new products for customer requirement discussions in order to gather more precise product information.

The configuration rule prototyping tool may, for example, be created using Java® technology, such as Java® Swing, or other technology flexible enough for such implementation. Operation of the configuration rule prototyping tool is driven from a feature code perspective. A feature code is a worldwide part number in component hierarchy files. A feature code perspective is used because at times only the feature code is needed to be added to the component hierarchy files, without creating any new configuration rules for an existing product. A component hierarchy file is a file that contains a list of component data, such as, for example, feature codes and groups supported, for one or more products.

In addition, when a configuration rule, which is not feature code specific, is created for a product category containing one or more products, the configuration rule is triggered accordingly as long as the feature code is present in the component hierarchy files and is present in the product category for the configuration rule. Thus, whenever a new feature code belongs to the same product category or has the same property created in existing configuration rules, these existing configuration rules are available for this new feature code. For feature code specific configuration rules, the configuration rule prototyping tool may make a configuration rule recommendation for a new product modeling category to the developer. Also, the developer may search existing configuration rules within different product categories for configuration rules that relate to a specific feature code. Further, the developer may add these configuration rules found in the search to another desired product category.

When a feature code is fully qualified, the configuration rule prototyping tool may define and use the fully qualified feature code as a normal feature code as the configuration rule prototyping tool may easily locate which product category the fully qualified feature code belongs to. A fully qualified feature code is an alias feature code with an additional prefix and/or suffix that is used for differentiating different features with the same feature code. It is not necessary for the configuration rule prototyping tool to model the fully qualified feature code from a product perspective as the configuration rule prototyping tool is able to relate the fully qualified feature code to a product category. In other words, the developer is not required to know which product the fully qualified code belongs to.

The configuration rule prototyping tool provides a setup user interface (UI) that allows a developer to define preferences related to the configuration rule prototyping tool and configuration contexts. Adding component modules to the configuration rule prototyping tool is also performed through this setup UI. During the addition of a component module, depending on the setup UI, the functionality of the component module may be automatically triggered or the functionality may be visible in a display before and/or after a working environment has started. For example, a developer may trigger the component module to do requirement template comparison, without loading a working environment, when this component module is setup to be visible outside the working environment for developer action.

Basically, a working environment groups modeling done for a particular product in a main folder. This working environment may be considered as a release environment, which the developer defines for use in checking in one or more files into a Configuration Management Version Control (CMVC), which provides common product versioning control. Developers may create multiple working environments for testing of prototyped products according to their preferences, as long as the developers know which working environment they need to use to check in their files.

Developers may create a totally new working environment for importing existing configuration rules or feature codes as needed. Alternatively, developers may use an existing working environment as a reference to create a new working environment, which will include everything that was contained in the previously existing working environment. If the configuration rule prototyping tool is defined to use a translation or transformation module during import of configuration rules or feature codes into a working environment, the configuration rule prototyping tool will use the translation or transformation module to automatically convert the imported configuration rules or feature codes into the proper format or syntax.

Once inside the desired working environment, the developer may perform prototyping or modeling without concern for the other working or release environments. When finished with product prototyping, the developer may export the new product prototype to another working environment. If the developer exports the new product prototype to another working environment, then the configuration rule prototyping tool automatically performs any necessary format translation or transformation of the product prototype.

During the product prototyping phase, the developer may search for existing feature codes (i.e., part numbers) or configuration rules within the current working environment or other existing working environments. Existing feature codes or configuration rules found in the search are listed in a UI for selection by the developer. Once a feature code or configuration rule is selected, a text panel is displayed for the developer to modify the selected feature code or configuration rule. After the developer modifies the selected feature code or configuration rule, the developer may add the modified feature code or configuration rule to the current working environment or update an existing feature code or configuration rule in the working environment with the modified feature code or configuration rule.

The configuration rule prototyping tool allows a developer to perform comparison of existing configuration rules, copy existing configuration rules, and replace words in existing configuration rules in order to allow the developer to define new configuration rules using the existing configuration rules. In addition, configuration rule prototyping tool automatically validates the newly defined configuration rules prior to inserting the new configuration rules or updating existing configuration rules in the current working environment.

Figure 3:
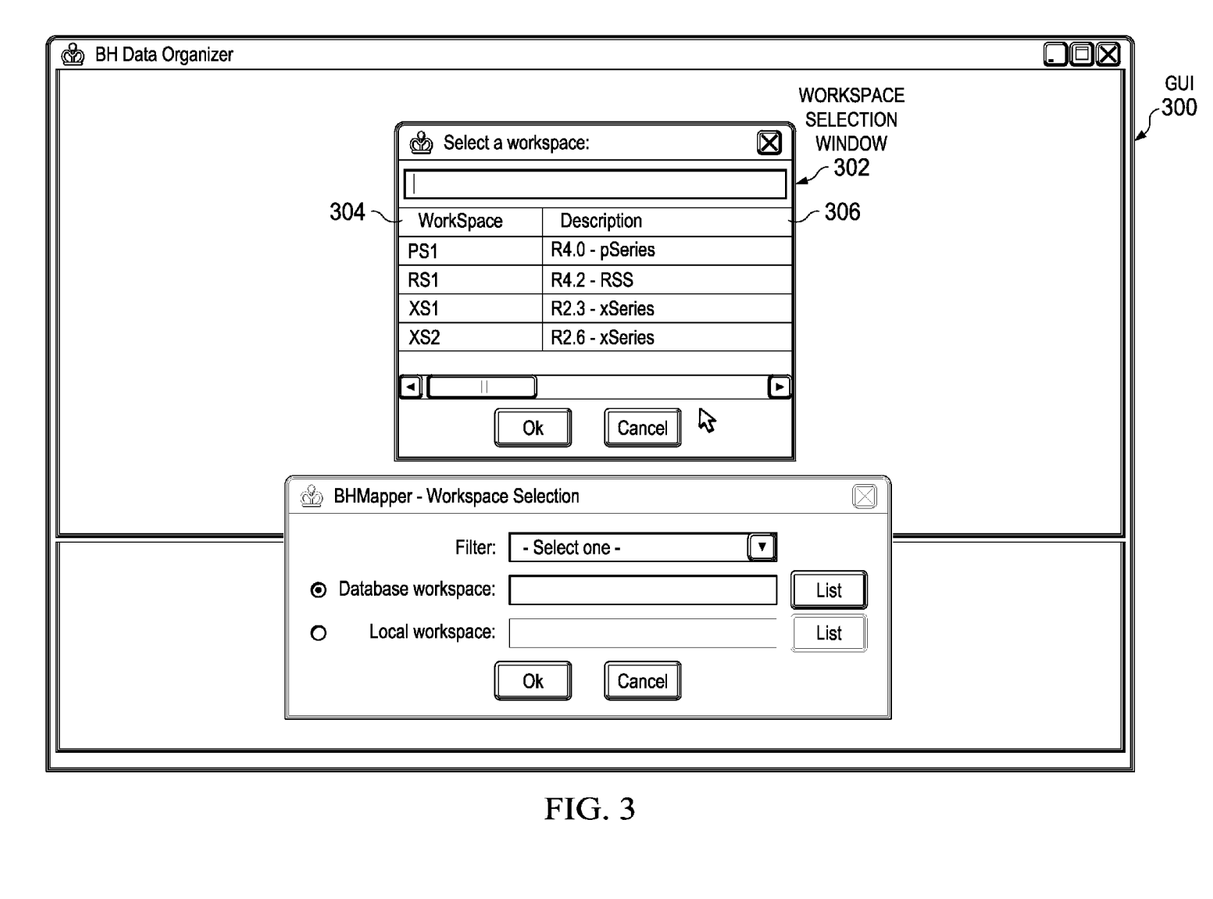
FIG. 3 is an exemplary illustration of a GUI for defining a workspace environment in accordance with an illustrative embodiment.

With reference now to FIG. 3, an exemplary illustration of a GUI for defining a workspace environment is depicted in accordance with an illustrative embodiment. GUI 300 is an example of a GUI that a developer uses to select and define a working environment for prototyping or modifying configuration rules for a configurable product. GUI 300 includes workspace selection window 302.

The developer uses workspace selection window 302 to select a working environment. Workspace selection window 302 includes workspace 304 and description 306. Workspace 304 identifies one or more specific working environments. In this exemplary illustration, workspace 304 identifies working environments "PS1", "RS1", "XS1", and "XS2".

Description 306 describes products prototyped in the respective working environments identified in workspace 304. In this exemplary illustration, description 306 includes product descriptions "R4.0—pSeries", "R4.2—RSS", "R2.3—xSeries", and "R2.6—xSeries". Also in this exemplary illustration, working environments "PS1", "RS19", "XS1", and "XS2" correspond with product descriptions "R4.0—pSeries", "R4.2—RSS", "R2.3—xSeries", and "R2.6—xSeries", respectively. In other words, product "R4.0—pSeries" is prototyped in working environment "PS1", product "R4.2—RSS" is prototyped in working environment "RS1", and so on.

Figure 4:
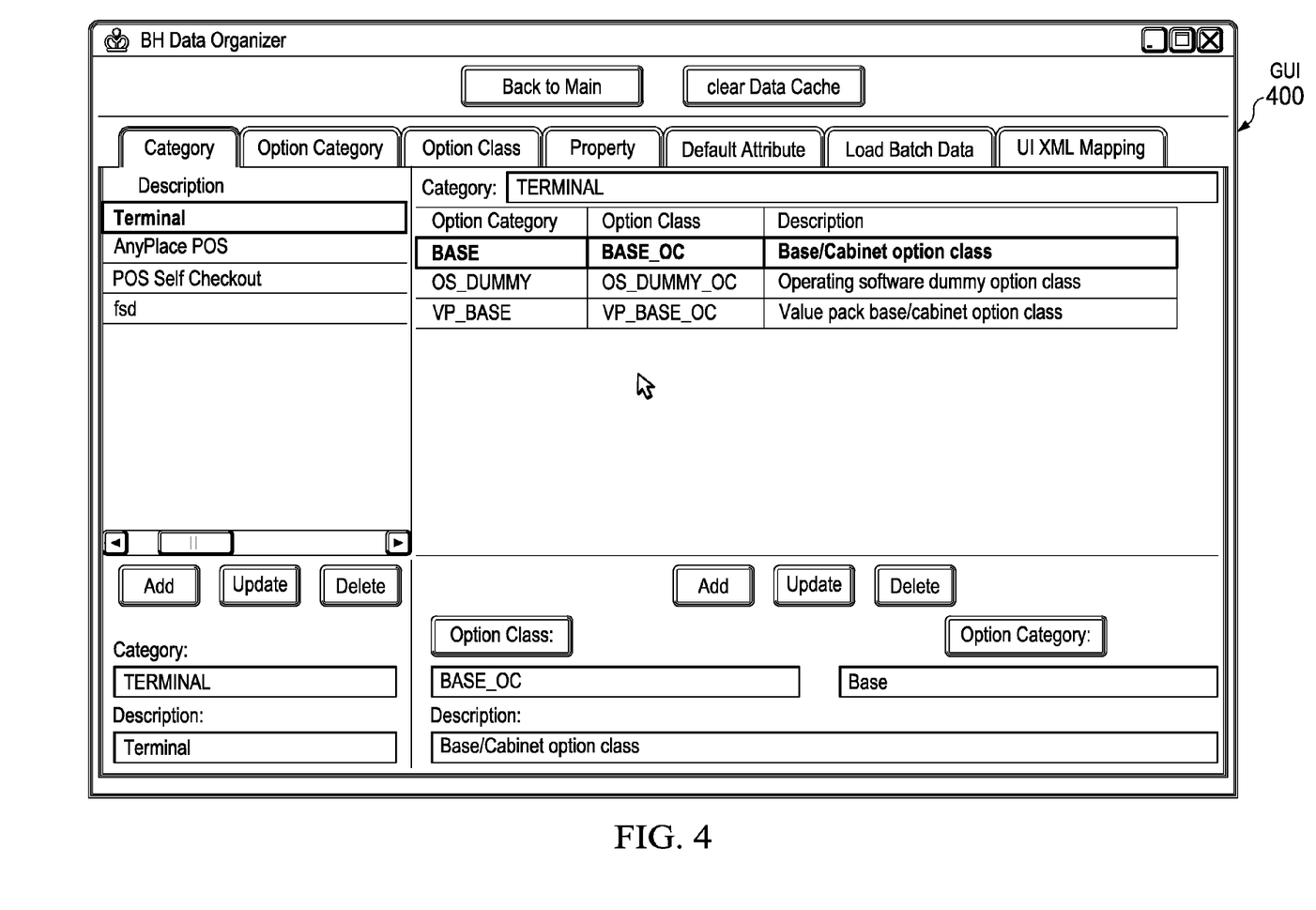
FIG. 4 is an exemplary illustration of a GUI for defining a setup environment and parameters in accordance with an illustrative embodiment.

With reference now to FIG. 4, an exemplary illustration of a GUI for defining a setup environment and parameters is depicted in accordance with an illustrative embodiment. GUI 400 is an example of a GUI that a developer uses to define workspace environment setup information, as well as common or default parameter values.

Figure 5A:
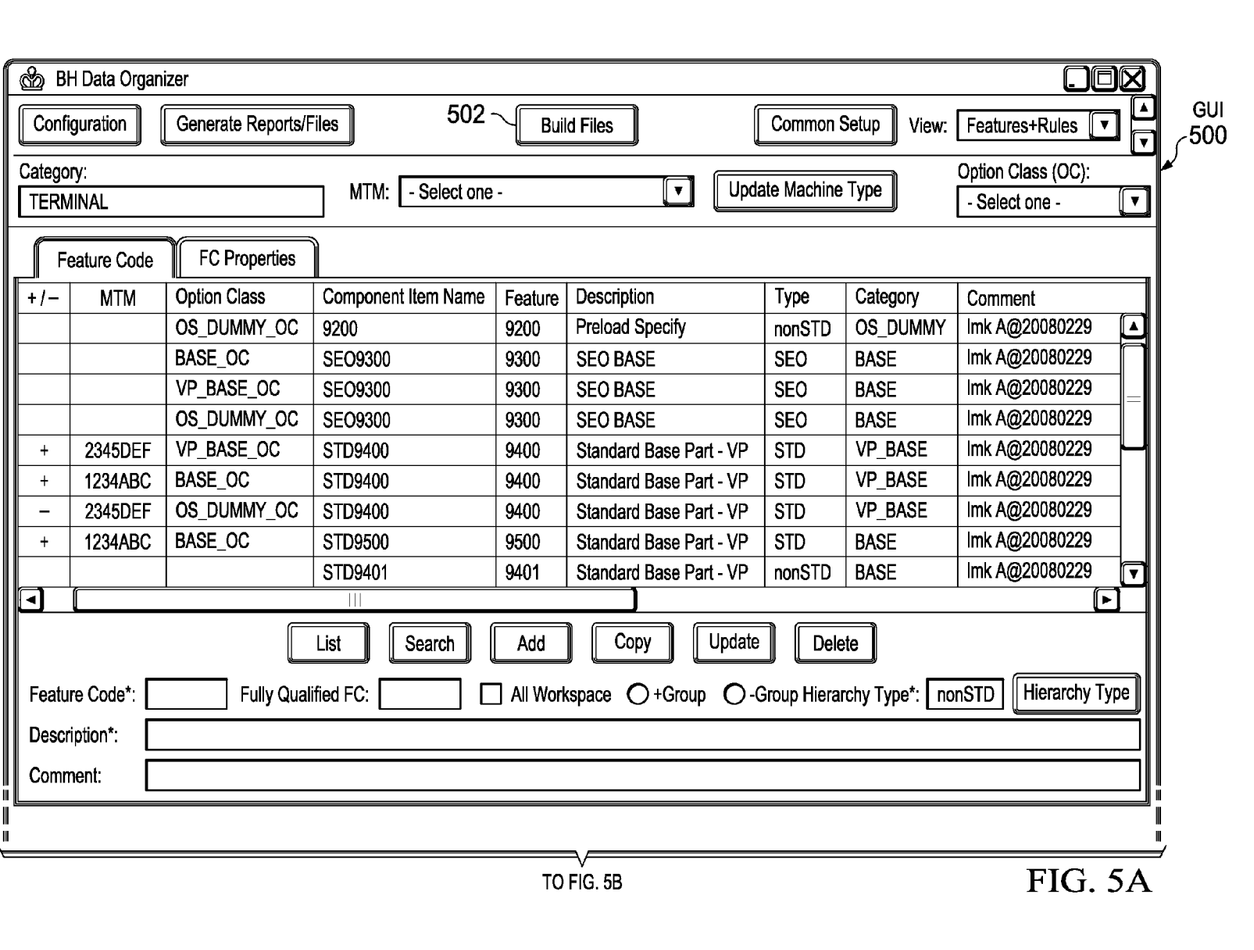
FIG. 5A and FIG. 5B is an exemplary illustration of a GUI for mapping data and modeling products in accordance with an illustrative embodiment.
Figure 5B:
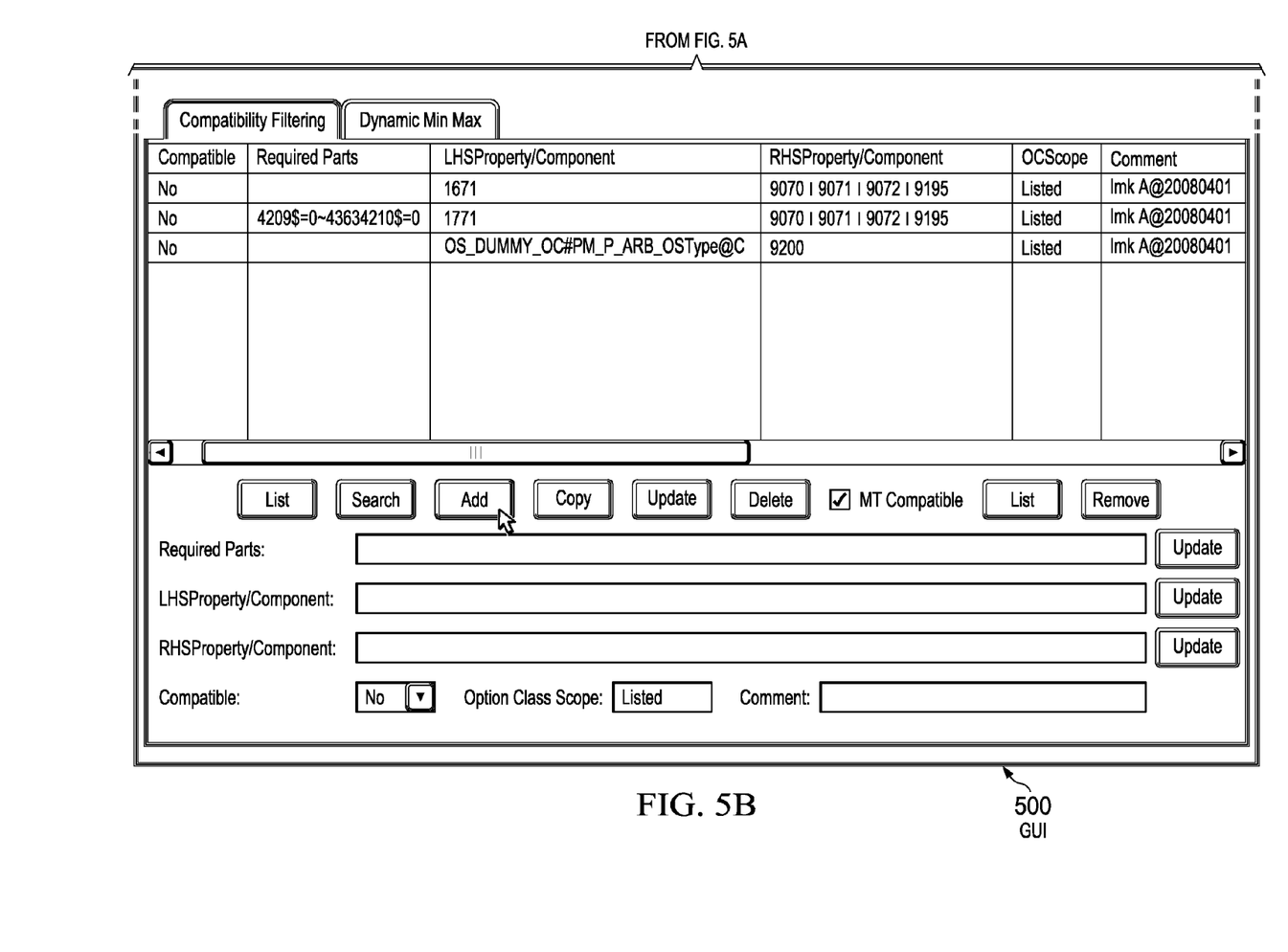

With reference now to FIG. 5A and FIG. 5B, an exemplary illustration of a GUI for mapping data and modeling products is depicted in accordance with an illustrative embodiment. GUI 500 is an example of a GUI that a developer uses to map data or prototype a product. GUI 500 includes "Build Files" button 502. The developer uses "Build Files" button 502 to automatically generate configuration rule build files, such as configuration rule build files 226 in FIG. 2, for a configurable product.

Figure 6:
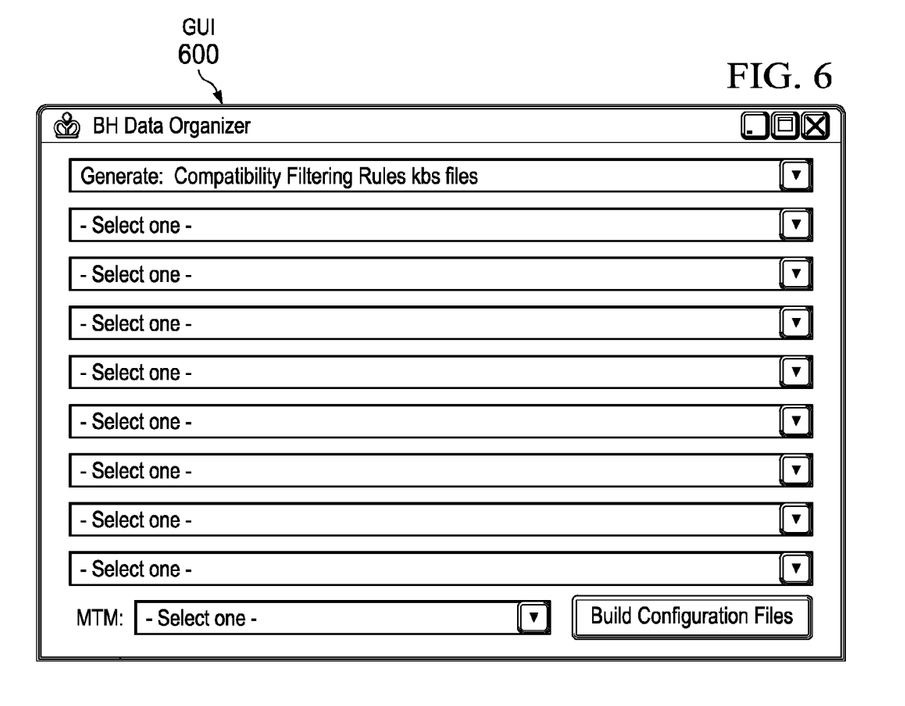
FIG. 6 is an exemplary illustration of a GUI for selecting build types to generate configuration rule build files in accordance with an illustrative embodiment.

With reference now to FIG. 6, an exemplary illustration of a GUI for selecting build types to generate configuration rule build files is depicted in accordance with an illustrative embodiment. GUI 600 is an example of a GUI that a developer uses to select one or more build types, such as build types 218 in FIG. 2, for generating or building configuration rule build files, such as configuration rule build files 226 in FIG. 2. In other words, the developer uses GUI 600 to select the type of configuration rule build files that need to be built.

In this exemplary illustration, the type of configuration rule build files that the developer selects to build are compatibility filtering configuration rules for .kbs files. The compatibility filtering configuration rules build file may be used by a configuration rule prototyping tool, such as configuration rule prototyping tool 216 in FIG. 2, to translate or transform the .kbs files into another file format, such as, for example, a CSV file format. In addition, the developer may use GUI 600 to select a MTM, if necessary.

Figure 7:
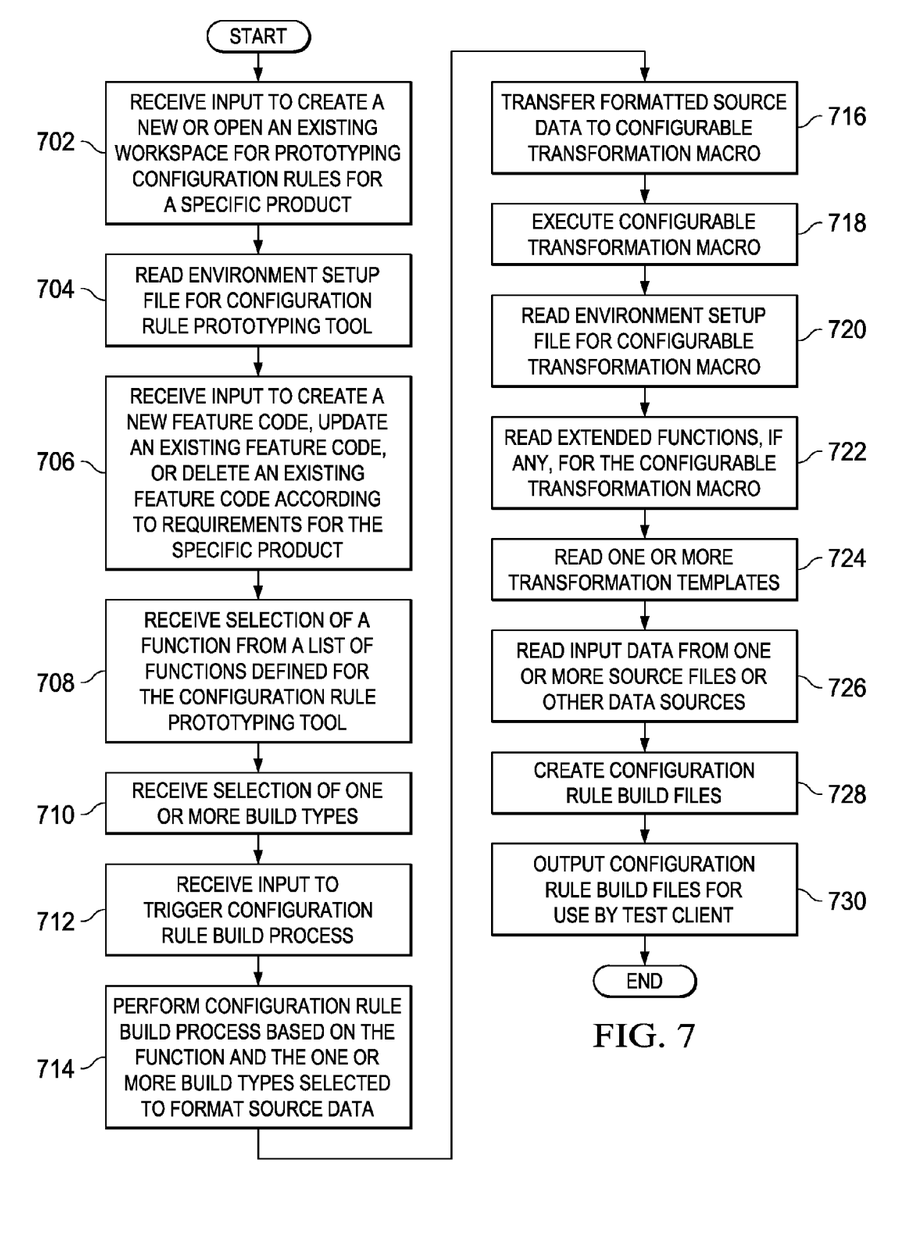
FIG. 7 is a flowchart illustrating an exemplary process for automatically creating configuration rule build files in accordance with an illustrative embodiment.

With reference now to FIG. 7, a flowchart illustrating an exemplary process for automatically creating configuration rule build files is shown in accordance with an illustrative embodiment. The process shown in FIG. 7 may be implemented in a data processing system, such as data processing system 200 in FIG. 2.

The process begins when the data processing system uses a configuration rule prototyping tool, such as configuration rule prototyping tool 216 in FIG. 2, to receive an input to create a new, or open an existing, workspace for prototyping configuration rules for a specific product, such as a particular MTM (step 702). After creating a new, or opening an existing, workspace in step 702, the configuration rule prototyping tool reads an environment setup file for the configuration rule prototyping tool (step 704). The environment setup file contains information regarding the environment that the configuration rule prototyping tool is being run in. In addition, the configuration rule prototyping tool receives an input to create a new feature code, update an existing feature code, or delete an existing feature code according to requirements for the specific product (step 706). A feature code may, for example, represent a hardware component, such as a part, assembly, or sub-assembly, or a software component, such as an application, program, or operating system, for the specific product. This new or modified information for the specific product is source data.

Then, the configuration rule prototyping tool receives a selection of a function by a user from a list of functions defined for the configuration rule prototyping tool (step 708). A function is a feature of the configuration rule prototyping tool that the user may interact with. A control to select a build type is one example of such a function defined for the configuration rule prototyping tool. Further, the configuration rule prototyping tool receives a selection of one or more build types, such as build types 218 in FIG. 2, by the user (step 710). Furthermore, the configuration rule prototyping tool receives an input by the user to trigger the configuration rule build process (step 712).

Then, the configuration rule prototyping tool performs the configuration rule build process based on the function and the one or more build types selected by the user to properly format the source data (step 714). Subsequently, the configuration rule prototyping tool transfers the properly formatted source data to a configurable transformation macro, such as configurable transformation macro 220 in FIG. 2 (step 716). Afterward, the configuration rule prototyping tool executes the configurable transformation macro (step 718).

Then, the configurable transformation macro reads an environment setup file for the configurable transformation macro (step 720). The environment setup file is a file that contains data regarding the environment that the configurable transformation macro is being run in and the connections the configurable transformation macro has, such as, for example, external function paths, database connections, server uniform resource locators (URLs), and temporary folders and initial parameters for the configurable transformation macro. In addition, the configurable transformation macro reads extended functions, if any, for the configurable transformation macro (step 722).

Further, the configurable transformation macro reads one or more transformation templates, such as transformation templates 222 in FIG. 2 (step 724). Furthermore, the configurable transformation macro reads input data from one or more source files, such as input data source files 224 in FIG. 2, or from other data sources, such as databases or data streams (step 726). Then, the configurable transformation macro creates configuration rule build files, such as configuration rule build files 226 in FIG. 2, for the specific product (step 728). Afterward, the configurable transformation macro outputs the configuration rule build files by, for example, writing the configuration rule build files to a storage device, such as persistent storage 208 in FIG. 2, for use by a test client application in a client device, such as client 110 in FIG. 1 (step 730). Thereafter, the process terminates.

Thus, illustrative embodiments of the present invention provide a computer implemented method, system, and computer program product for automatically building configuration rule build files. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatically creating configuration rule build files, the computer implemented method comprising:
    receiving, by a data processing system, an input to create a new workspace from an existing workspace as a reference to prototype configuration rules for a particular hardware configuration of a new machine prototype;
    receiving, by the data processing system, one or more hardware part number inputs from a developer according to requirements of the particular hardware configuration of the new machine prototype, wherein the one or more hardware part number inputs are source data in a first file format;
    receiving, by the data processing system, a selection of a function from a list of functions defined for a configuration rule prototyping tool;
    receiving, by the data processing system, a selection of one or more build types that are keys to a type of build process that is triggered prior to generation of a configuration rule build file;
    performing, by the data processing system, a configuration rule build process based on the function and the one or more build types selected to format the source data in the first file format into a second file format using the configuration rule prototyping tool;
    transforming, by the data processing system, the source data in the first file format into the second file format using a configurable transformation macro that reads an environment setup file associated with the configurable transformation macro containing information regarding an environment the configurable transformation macro is run in and connections the configurable transformation macro has to external function paths, database connections, server uniform resource locators, temporary folders, and initial parameters for the configurable transformation macro, wherein the configurable transformation macro utilizes a transformation macro script to control transformation of the source data in the first file format into the second file format and a transformation template containing source input data, default values, and logic used by the configurable transformation macro;
    generating, by the data processing system, the configuration rule build file for the particular hardware configuration of the new machine prototype using the source data in the second file format;
    outputting, by the data processing system, the configuration rule build file to a test client that tests the particular hardware configuration of the new machine prototype using the configuration rule build file to reflect how the configuration rule build file is used in a production environment; and
    providing, by the data processing system, configuration rule recommendations for the particular hardware configuration of the new machine prototype.

2. The computer implemented method of claim 1, wherein the configuration rule build file includes a set of specific configuration rules and hardware part numbers for the particular hardware configuration of the new machine prototype.

3. The computer implemented method of claim 2, wherein the set of specific configuration rules and hardware part numbers defines specific constraints on the particular hardware configuration of the new machine prototype.

4. A data processing system for automatically creating configuration rule build files, the data processing system comprising:
    a bus system;
    a storage device connected to the bus system, wherein the storage device stores a set of instructions; and
    a processing unit connected to the bus system, wherein the processing unit executes the set of instructions to receive an input to create a new workspace from an existing workspace as a reference to prototype configuration rules for a particular hardware configuration of a new machine prototype; receive one or more hardware part number inputs from a developer according to requirements of the particular hardware configuration of the new machine prototype, wherein the one or more hardware part number inputs are source data in a first file format; receive a selection of a function from a list of functions defined for a configuration rule prototyping tool; receive a selection of one or more build types that are keys to a type of build process that is triggered prior to generation of a configuration rule build file; perform a configuration rule build process based on the function and the one or more build types selected to format the source data in the first file format into a second file format using the configuration rule prototyping tool; transform the source data in the first file format into the second file format using a configurable transformation macro that reads an environment setup file associated with the configurable transformation macro containing information regarding an environment the configurable transformation macro is run in and connections the configurable transformation macro has to external function paths, database connections, server uniform resource locators, temporary folders, and initial parameters for the configurable transformation macro, wherein the configurable transformation macro utilizes a transformation macro script to control transformation of the source data in the first file format into the second file format and a transformation template containing source input data, default values, and logic used by the configurable transformation macro; generate the configuration rule build file for the particular hardware configuration of the new machine prototype using the source data in the second file format; output the configuration rule build file to a test client that tests the particular hardware configuration of the new machine prototype using the configuration rule build file to reflect how the configuration rule build file is used in a production environment; and provide configuration rule recommendations for the particular hardware configuration of the new machine prototype.

5. The data processing system of claim 4, wherein the configuration rule build file includes a set of specific configuration rules and part numbers for the particular configuration of the machine prototype.

6. The data processing system of claim 5, wherein the set of specific configuration rules and part numbers defines specific constraints on the particular configuration of the machine prototype.

7. A computer program product stored in a computer readable storage device having computer usable program code embodied therein that is executable by a computer for automatically creating configuration rule build files, the computer program product comprising:

computer usable program code for receiving an input to create a new workspace from an existing workspace as a reference to prototype configuration rules for a particular hardware configuration of a new machine prototype;

computer usable program code for receiving one or more hardware part number inputs from a developer according to requirements of the particular hardware configuration of the new machine prototype, wherein the one or more hardware part number inputs are source data in a first file format;

computer usable program code for receiving a selection of a function from a list of functions defined for a configuration rule prototyping tool;

computer usable program code for receiving a selection of one or more build types that are keys to a type of build process that is triggered prior to generation of a configuration rule build file;

computer usable program code for performing a configuration rule build process based on the function and the one or more build types selected to format the source data in the first file format into a second file format using the configuration rule prototyping tool;

computer usable program code for transforming the source data in the first file format into the second file format using a configurable transformation macro that reads an environment setup file associated with the configurable transformation macro containing information regarding an environment the configurable transformation macro is run in and connections the configurable transformation macro has to external function paths, database connections, server uniform resource locators, temporary folders, and initial parameters for the configurable transformation macro, wherein the configurable transformation macro utilizes a transformation macro script to control transformation of the source data in the first file format into the second file format and a transformation template containing source input data, default values, and logic used by the configurable transformation macro;

computer usable program code for generating the configuration rule build file for the particular hardware configuration of the new machine prototype using the source data in the second file format;

computer usable program code for outputting the configuration rule build file to a test client that tests the particular hardware configuration of the new machine prototype using the configuration rule build file to reflect how the configuration rule build file is used in a production environment; and computer usable program code for providing configuration rule recommendations for the particular hardware configuration of the new machine prototype.

8. The computer program product of claim 7, wherein the configuration rule build file includes a set of specific configuration rules and hardware part numbers for the particular hardware configuration of the new machine prototype.

9. The computer program product of claim 8, wherein the set of specific configuration rules and hardware part numbers defines specific constraints on the particular hardware configuration of the new machine prototype.

* * * * *